United States Patent [19]

Micic et al.

[11] Patent Number: 4,621,374

[45] Date of Patent: Nov. 4, 1986

[54] CIRCUIT ARRANGEMENT FOR PROCESSING, TRANSMITTING, AND ACOUSTICALLY REPRODUCING DIGITIZED AUDIO-FREQUENCY SIGNALS

[75] Inventors: Ljubo Micic, Freiburg; Edmund Zaehringer, Ehrenkirchen, both of Fed. Rep. of Germany

[73] Assignee: ITT Industries, Inc., New York, N.Y.

[21] Appl. No.: 447,903

[22] Filed: Dec. 8, 1982

[30] Foreign Application Priority Data

Dec. 24, 1981 [EP] European Pat. Off. ......... 81710059.7

[51] Int. Cl.⁴ ............................................... H04B 9/00
[52] U.S. Cl. .................... 455/603; 370/110.1; 381/105; 455/608; 455/617
[58] Field of Search ............... 455/603, 617, 618, 608; 371/37; 360/32; 370/110.1, 110.4, 111; 358/194.1; 381/2, 3, 4, 77, 80, 82, 105

[56] References Cited

U.S. PATENT DOCUMENTS

| | | | |
|---|---|---|---|
| 3,881,063 | 4/1975 | Mawake et al. | 381/5 |
| 3,924,120 | 12/1975 | Cox, III | 455/603 |
| 3,927,316 | 12/1975 | Citta | 455/608 |
| 4,020,461 | 4/1977 | Adams et al. | 371/37 |
| 4,081,747 | 3/1978 | Meyerle | 455/88 |
| 4,254,500 | 3/1981 | Brookhart | 360/32 |
| 4,282,605 | 8/1981 | Bose | 455/617 |
| 4,291,411 | 9/1981 | Müller | 455/603 |
| 4,437,185 | 3/1984 | Sako et al. | 371/39 |

Primary Examiner—Joseph A. Orsino, Jr.
Attorney, Agent, or Firm—Donald J. Lenkszus

[57] ABSTRACT

Digitized audio-frequency signals are processed in a signal processor (SP) together with digital control signals and pass through a wireless infrared transmission link (I) whose receiver (E) and a following power amplifier (V) are incorporated in a loudspeaker box (B). The audio-frequency signals are coded in a protected code and are fed first to a code-conversion/error-correction processor (CP), then to the signal processor (SP), and then to an RF modulator (M) which drives the transmitter (S) of the transmission link (I).

In a modification, the code-conversion/error-correction processor (CP) and the signal processor (SP) are disposed within the loudspeaker box (B'), so that errors arising on the transmission link (I) can be compensated for.

36 Claims, 4 Drawing Figures

CIRCUIT ARRANGEMENT FOR PROCESSING, TRANSMITTING, AND ACOUSTICALLY REPRODUCING DIGITIZED AUDIO-FREQUENCY SIGNALS

BACKGROUND OF THE INVENTION

The present invention relates to a circuit arrangement for processing, transmitting, and acoustically reproducing digitized audio-frequency signals which are processed in a signal processor together with digital control signals such as volume, tone, stereo balance, etc., and pass through an infrared transmission link whose receiver and a following power amplifier are incorporated in a loudspeaker box. The block diagram of such a circuit arrangement was made accessible to the public by the applicant at the September 1981 Berlin International Radio and Television Exhibition in the form of a chart. The infrared transmission link consisted of an infrared transmitter, an infrared receiver, and an optical-fiber cable interconnecting the transmitter and the receiver. As the infrared receiver and the following power amplifier are disposed within the loudspeaker box, this arrangement was called an "active" loudspeaker box ("active box").

The fiber-optic infrared transmission link has a certain disadvantage in that it limits the freedom to arrange the components of an audio system.

SUMMARY OF THE INVENTION

It is an object of the invention to provide a circuit arrangement such that the active boxes can be arranged freely from the remainder of the system. The invention utilizes wireless infrared sound transmission as is known per se in audio equipment installed for the hard of hearing in large assembly rooms, but modifies this principle of transmission with respect to the processing of audio-frequency signals digitized in a protected code. Such signals are present, for example, on the so-called digital disk; they are digitized using the so-called Cross Interleave Reed Solomon code (CIR code), cf. a publication by Sony Corp. /N.V. Philips entitled "Compact Disc Digital Audio", September, 1980.

The advantages of the invention lie directly in the solution of the problem but also in the fact that all signal processing operations can be performed with digital integrated circuits which are stable in operation, digitally controllable, insensitive to interference, and programmable. Furthermore, during the design of such digital systems, the operation and behaviour of the circuits to be implemented can be fully simulated by computers. A particular advantage of the invention follows from the fact that the digital data can reach the active boxes; on the infrared transmission link, they are modulated onto an RF carrier, which can be done by using conventional techniques, such as frequency-shift keying or similar modulation methods.

BRIEF DESCRIPTION OF THE DRAWINGS

The invention will now be explained in more detail with reference to the accompanying drawings, in which.

DETAILED DESCRIPTION OF THE INVENTION

Figure 1:
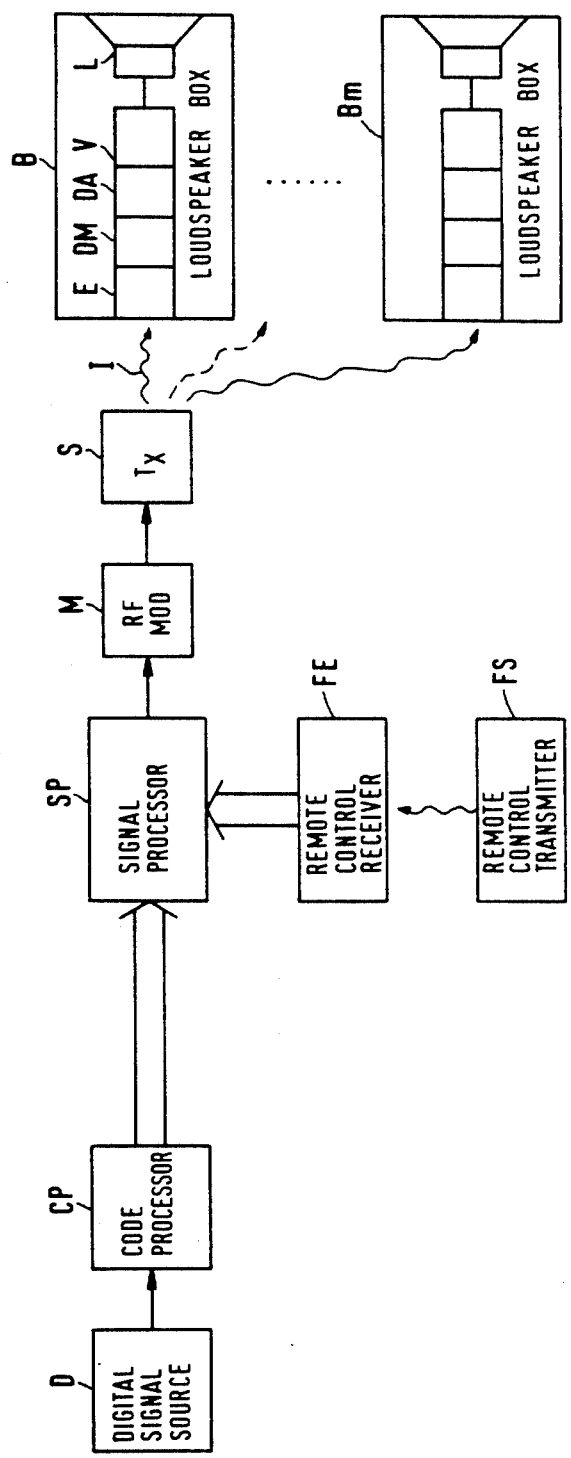
FIG. 1 is a block diagram illustrating the principle underlying the invention.

The block diagram of FIG. 1 shows the digital-signal source D, which encodes the audio-frequency signals, i.e., signals coming from a microphone, for example, in a protected code, i.e., in a redundant code which permits not only error detection but also error correction, such as the above-mentioned CIR code.

The output of the digital-signal source D is connected to the input of the code-conversion/error-correction processor CP, which performs the necessary error correction and converts the code of the source D to a, e.g, nonredundant code. Further processing of the digitized audio-frequency signals then takes place on the basis of this code in the signal processor SP, to which the output signals of the code-conversion/error-correction processor CP are transferred in parallel, as are the digital control signals from the remote-control receiver FE, which are transmitted to the latter from the remote-control transmitter FS. The digital control signals may also, of course, come from any other digital control unit that may be associated with the circuit arrangement according to the invention.

In the signal processor SP, the digital control signals are combined with or added to the digitized audio-frequency signals in the known manner to control corresponding values, such as volume, tone, stereo balance, base width, etc. The output signals of the signal processor SP, which are now delivered in serial form, are fed to the RF modulator M, which, in turn, drives the transmitter S of the wireless infrared transmission link I.

At least one loudspeaker box B is disposed at the receiving end of the infrared transmission link I; FIG. 1 shows only two boxes B, Bm of the plurality of boxes that are possible. Each loudspeaker box B, Bm contains the reciever E of the infrared transmission link I, the RF demodulator DM, the digital-to-analog converter DA, the power amplifier V, and the loudspeaker L, which are connected in series with respect to the signal flow in this order.

If several loudspeaker boxes B, Bm are associated with a single transmitter S, control signals differing from those for the other loudspeaker boxes may be provided for each box, which are again fed to the signal processor SP. With several loudspeaker boxes and a single transmitter S it is also necessary to assign to each loudspeaker box its own carrier frequency of the RF modulator M.

Figure 2:
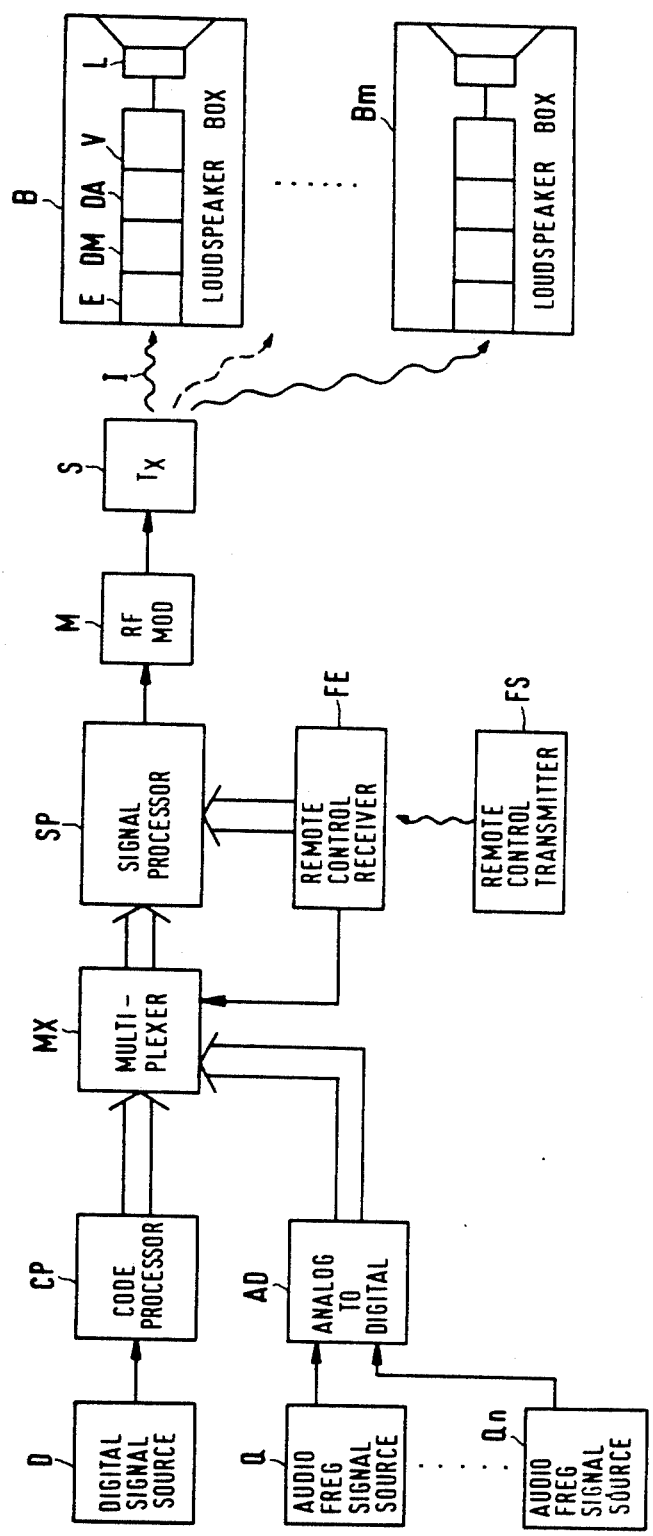
FIG. 2 shows a development of the invention for the connection of additional AF signal sources to the circuit arrangement of FIG. 1.

FIG. 2 shows a development of the basic arrangement of FIG. 1 in which not only the digital-signal source D but also other audio-frequency signal sources Q, Qn can be connected. To make this possible, a multiplexer MX, to which the signals from the additional audio-frequency signal sources Q, Qn are fed through the analog-to-digital converter AD, must be inserted between the code-conversion/error-correction processor CP and the signal processor SP. Advantageously, the multiplexer MX is controlled by the control-signal source, i.e., the remote-control receiver FE, for example. The development of FIG. 2 thus makes it possible, for example, to not only play digital disks in an audio system but also operate the system with further audio-frequency signal sources of the usual kind, such as a cassette recorder, a radio or a conventional record player.

Figure 3:
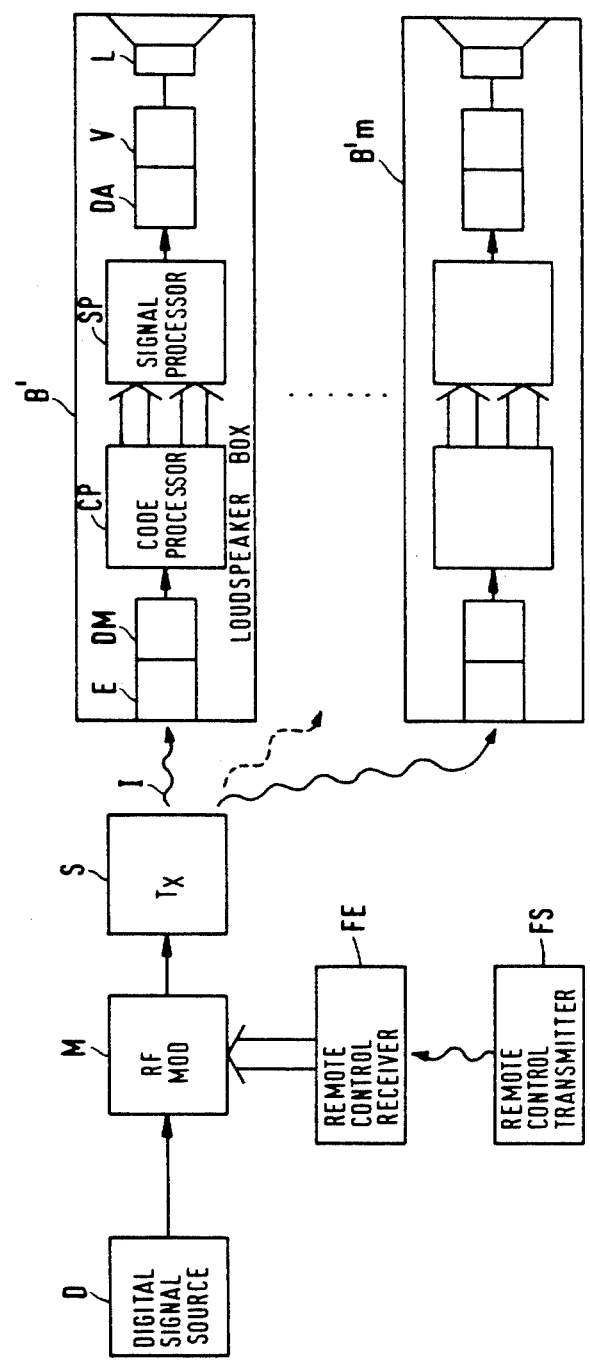
FIG. 3 is a block diagram of a modification of the invention in which the order of the individual subcircuits is different from that in the arrangement of FIG. 1.

FIG. 3 shows a principle in which the order of the individual subcircuits of the circuit arrangement according to the invention has been changed so that a considerable improvement is obtained on the basic arrangement of FIG. 1 with respect to error correction. In the arrangement of FIG. 3, the code-conversion/error-correction processor CP is incorporated in the loudspeaker box B', B'm. This has the essential advantage that even errors arising on the wireless infrared transmission link I are correctable. The subcircuits in the arrangement of FIG. 3 are so arranged that the digital-signal source D drives the RF modulator M direct, which is also fed with the digital control signals coming, for example, from the receiver FE of a remote-control facility. The RF modulator M drives the transmitter S of the wireless infrared transmission link I. At the receiving end of the link, e.g., within the loudspeaker box B', the following subcircuits are connected in series with respect to the signal flow in this order: receiver E, RF demodulator DM, code-conversion/error-correction processor CP, signal processor SP, digital-to-analog converter DA, power amplifier V, and loudspeaker L. In the arrangement of FIG. 3, too, it is possible, of course, to drive a plurality of loudspeaker boxes B', B'm with a single transmitter S, in which case each loudspeaker box requires a carrier frequency of its own. Likewise, separate control signals as described in connection with FIG. 2 may be provided for the individual loudspeaker boxes B', B'm.

Figure 4:
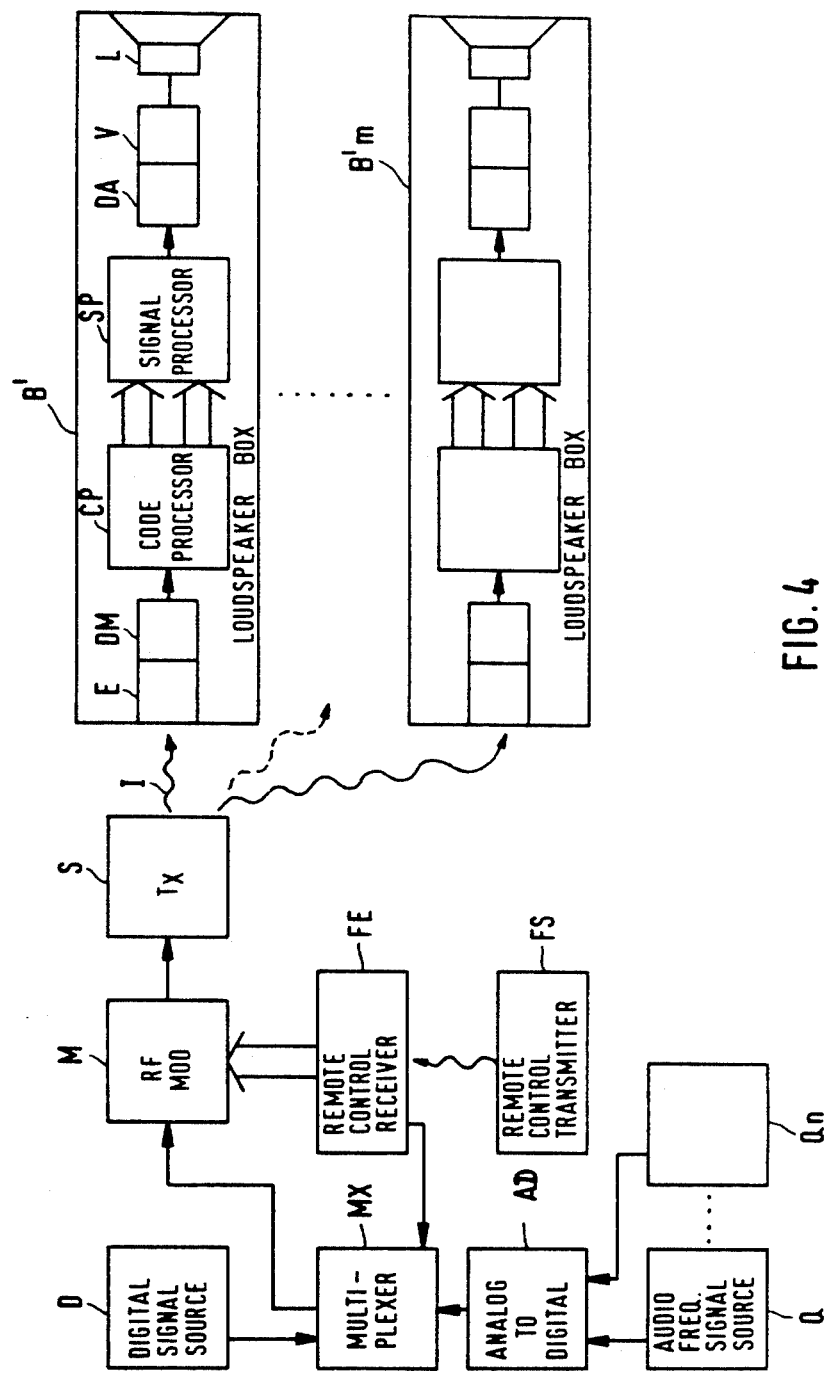
FIG. 4 shows the connection of additional AF signal sources to the arrangement of FIG. 3.

FIG. 4 shows in analogy to FIG. 2 that the arrangement of FIG. 3, too, permits the connection of additional audio-frequency signal sources Q, Qn via the analog-to-digital converter AD and the multiplexer MX.

The need to assign to each active box a carrier frequency of its own is eliminated if signals for two or more loudspeaker boxes are transmitted on an RF carrier, e.g., on a time-division multiplex basis. In the various receiving circuits, the respective desired signals are then extracted from the overall data stream.

We claim:

1. Apparatus for processing digitized audio frequency signals together with digital control signals, said digitized audio frquency signals being coded in a protected code, said apparatus comprising:
   a code processor receiving said digitized audio frequency signals, performing error correction and converting said digitized audio frequency signals to a non-redundant code to provide digital output signals at an output;
   a signal processor receiving said digital output signals and said digital control signals, said signal processor combining said digital output signals with said digital control signals to provide serial digital output signals;
   an RF modulator having an input receiving said serial digital output signals;
   an infrared transmitter driven by said RF modulator;
   an infrared receiver coupled to said infrared transmitter by a wireless link;
   an RF demodulator coupled to the output of said receiver;
   a digital to analog converter coupled to the output to said RF demodulator;
   a power amplifier coupled to the analog output of said converter; and
   a loudspeaker driven by said power amplifier.

2. Apparatus in accordance with claim 1, wherein:
   said digital audio frequency signals are received from a digital disk and said protected code is a Cross Interleave Reed Solomon code (CIR code).

3. Apparatus in accordance with claim 1 further comprising:
   a multiplexer disposed between said code processor and said signal processor, said multiplexer having first inputs for receiving said digital output signals and having second inputs for receiving second digital output signals representative of audio signals.

4. Apparatus in accordance with claim 3, wherein:
   said digital audio frequency signals are received from a digital disk and said protected code is a Cross Interleave Reed Solomon code (CIR code).

5. Apparatus in accordance with claim 3, wherein said second digital output signals are generated by an analog to digital converter having its analog inputs coupled to an audio frequency signal source.

6. Apparatus in accordance with claim 5, wherein:
   said digital audio frequency signals are received from a digital disk and said protected code is a Cross Interleave Reed Solomon code (CIR code).

7. Apparatus in accordance with claim 5, wherein:
   said infrared receiver, said RF demodulator, said digital to analog converter, said power amplifier and said loudspeaker are in a first loudspeaker box; and
   said second infrared receiver, said second RF demodulator, said second digital to analog converter, said second power amplifier and said second loudspeaker are in a second loudspeaker box.

8. Apparatus in accordance with claim 7, wherein:
   said digital audio frequency signals are received from a digital disk and said protected code is a Cross Interleave Reed Solomon code (CIR code).

9. Apparatus in accordance with claim 3, further comprising:
   at least a second infrared receiver coupled to said infrared transmitter by a wireless link;
   a second RF demodulator coupled to the output of said second receiver;
   a second digital to analog converter coupled to the output of said second RF demodulator;
   a second power amplifier coupled to the analog output of said second converter;
   and a second loudspeaker driven by said second power amplifier.

10. Apparatus in accordance with claim 9 wherein:
    said digital audio frequency signals are received from a digital disk and said protected code is a Cross Interleave Reed Solomon code (CIR code).

11. Apparatus in accordance with claim 9, wherein:
    said infrared receiver, said RF demodulator, said digital to analog converter, said power amplifier and said loudspeaker are in a first loudspeaker box; and
    said second infrared receiver, said second RF demodulator, said second digital to analog converter, said second power amplifier and said second loudspeaker are in a second loudspeaker box.

12. Apparatus in accordance with claim 11, wherein:

said digital audio frequency signals are received from a digital disk and said protected code is a Cross Interleave Reed Solomon code (CIR code).

13. Apparatus in accordance with claim 11, wherein each of said first and second loudspeaker boxes is assigned its own carrier frequency of said RF modulator.

14. Apparatus in accordance with claim 11, wherein: said digital audio frequency signals are received from a digital disk and said protected code is a Cross Interleave Reed Solomon code (CIR code).

15. Apparatus for processing, transmitting and acoustically reproducing digitized audio frequency signals together with digital control signals, said digitized audio frequency signals and said digitized control signals being coded in a protected code, said arrangement comprising:

an RF modulator combining said digitized audio frequency signals and said digital control signals and providing modulation signals;

an infrared transmitter driven by said RF modulator;

an infrared receiver coupled to said infrared transmitter by a wireless link;

an RF demodulator coupled to the output of said receiver;

a code processor coupled to the output of said RF demodulator for performing error correction and converting the output signals of said RF demodulator into output digital audio signals and output digital control signals both encoded in a nonredundant code;

a signal processor receiving said digital audio signals and said output digital control signals and operating on said output digital audio signals in accordance with said output digital control signals to provide digital output signals;

a digital to analog converter coupled to said signal processor to convert said digital output signals to analog signals at an output;

a power amplifier coupled to the output of said digital to analog converter; and a loudspeaker driven by said power amplifier.

16. Apparatus in accordance with claim 15, wherein: said digital audio frequency signals are received from a digital disk and said protected code is a Cross Interleave Reed Solomon code (CIR code).

17. Apparatus in accordance with claim 15, comprising:

at least a second infrared receiver coupled to said infrared transmitter by a wireless link;

a second RF demodulator coupled to the output of said second receiver;

a second code processor coupled to the output of said second RF demodulator;

a second signal processor coupled to the output of said second code processor;

a second digital to analog converter coupled to the output of said second signal processor;

a second power amplifier coupled to the output of said second digital to analog converter; and a second loudspeaker driven by said second power amplifier.

18. Apparatus in accordance with claim 17, wherein: said digital audio frequency signals are received from a digital disk and said protected code is a Cross Interleave Reed Solomon code (CIR code).

19. Apparatus in accordance with claim 15 wherein: said infrared receiver, said RF demodulator, said code processor, said signal processor, said digital to analog converter, said power amplifier and said loudspeaker are all contained in a loudspeaker box.

20. Apparatus in accordance with claim 19, wherein: said digital audio frequency signals are received from a digital disk and said protected code is a Cross Interleave Reed Solomon code (CIR code).

21. Apparatus in accordance with claim 19, comprising:

at least a second infrared receiver coupled to said infrared transmitter by a wireless link;

a second RF demodulator coupled to the output of said second receiver;

a second code processor coupled to the output of said second RF demodulator;

a second signal processor coupled to the output of said second code processor;

a second digital to analog converter coupled to the output of said second signal processor;

a second power amplifier coupled to the output of said second digital to analog converter; and a second loudspeaker driven by said second power amplifier.

22. Apparatus in accordance with claim 21, wherein: said digital audio frequency signals are received from a digital disk and said protected code is a Cross Interleave Reed Solomon code (CIR code).

23. Apparatus in accordance with claim 21, wherein: said second infrared receiver, said second RF demodulator, said second code processor, said second signal processor, said second digital to analog converter, said second power amplifier, and said second loudspeaker are contained in a second loudspeaker box.

24. Apparatus in accordance with claim 23, wherein each of said first and second loudspeaker boxes is assigned its own carrier frequency of said RF modulator.

25. Apparatus in accordance with claim 23, wherein: said digital audio frequency signals are received from a digital disk and said protected code is a Cross Interleave Reed Solomon code (CIR code).

26. Apparatus in accordance with claim 23, wherein said digital control signals include first digital control signals for said signal processor and second digital control signals for said second signal processor.

27. Apparatus for processing first digitized audio frequency signals together with digital control signals, said first digitized audio frequency signals and said digital control signals being coded in a protected code said arrangement comprising:

a multiplexer for multiplexing said first digitized audio frequency signals with other digital audio frequency signals to provide second digitized audio frequency signals;

an RF modulator combining said second digitized audio frequency signals and said digital control signals and providing modulation signals;

an infrared transmitter driven by said RF modulator;

an infrared receiver coupled to said infrared transmitter by a wireless link;

an RF demodulator coupled to the output of said receiver;

a code processor coupled to the output of said RF demodulator for performing error correction and converting the output signals of said RF demodulator into output digital audio signals and output digital control signals both encoded in a non redundant code;

a signals processor receiving said digital audio signals and said output digital control signals and operating on said digital audio signals in accordance with said output digital control signals to provide digital output signals;

a digital to analog converter coupled to said signal processor to convert said digital output signals to analog signals at an output;

a power amplifier coupled to the output of said digital to analog converter; and a loudspeaker driven by said power amplifier.

28. Apparatus in accordance with claim 27, wherein: said digital audio frequency signals are received from a digital disk and said protected code is a Cross Interleave Reed Solomon code (CIR code).

29. Apparatus in accordance with claim 27, wherein each of said first and second loudspeaker boxes is assigned its own carrier frequency of said RF modulator.

30. Apparatus in accordance with claim 29, wherein: said digital audio frequency signals are received from a digital disk and said protected code is a Cross Interleave Reed Solomon code (CIR code).

31. Apparatus in accordance with claim 27 wherein: said infrared receiver, said RF demodulator, said code processor, said signal processor, said digital to analog converter, said power amplifier and said loudspeaker are all contained in a loudspeaker box.

32. Apparatus in accordance with claim 31, wherein: said digital audio frequency signals are received from a digital disk and said protected code is a Cross Interleave Reed Solomon code (CIR code).

33. Apparatus in accordance with claim 31, comprising:

at least a second infrared receiver coupled to said infrared transmitter by a wireless link;

a second RF demodulator coupled to the output of said second receiver;

a second code processor coupled to the output of said second RF demodulator;

a second signal processor coupled to the output of said second code processor;

a second digital to analog converter coupled to the output of said second signal processor;

a second power amplifier coupled to the output of said second digital to analog converter; and a second loudspeaker driven by said second power amplifier.

34. Apparatus in accordance with claim 33, wherein: said digital audio frequency signals are received from a digital disk and said protected code is a Cross Interleave Reed Solomon code (CIR code).

35. Apparatus in accordance with claim 33, wherein: said second infrared received, said second RF demodulator, said second code processor, said second signal processor, said second digital to analog converter, said second power amplifier, and said second loudspeaker are container in a second loudspeaker box.

36. Apparatus in accordance with claim 35, wherein: said digital audio frequency signals are received from a digital disk and said protected code is a Cross Interleave Reed Solomon code (CIR code).

* * * * *